(12) United States Patent
Faber et al.

(10) Patent No.: US 6,477,252 B1
(45) Date of Patent: Nov. 5, 2002

(54) DIGITAL VIDEO CONTENT TRANSMISSION CIPHERING AND DECIPHERING METHOD AND APPARATUS

(75) Inventors: Robert W. Faber, Hillsboro, OR (US); David A. Lee, Beaverton, OR (US); Brendan S. Traw, Portland, OR (US); Gary L. Graunke, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/385,590

(22) Filed: Aug. 29, 1999

(51) Int. Cl.[7] .............................. H04N 7/167; H04L 9/32
(52) U.S. Cl. ...................... 380/200; 380/201; 380/259; 713/193
(58) Field of Search .................... 380/200–203, 380/211, 229, 44, 259–261, 268, 37, 42, 46; 713/171, 193; 705/56

(56) References Cited

U.S. PATENT DOCUMENTS

| | | | |
|---|---|---|---|
| 4,316,055 A | * 2/1982 | Feistel | 380/37 |
| 4,613,901 A | * 9/1986 | Gilhousen | 380/239 |
| 4,953,208 A | 8/1990 | Ideno | |
| 5,020,106 A | * 5/1991 | Rabold et al. | 713/160 |
| 5,195,136 A | * 3/1993 | Hardy et al. | 380/43 |
| 5,509,073 A | 4/1996 | Monnin | |
| 5,590,194 A | 12/1996 | Ryan | |
| 5,621,799 A | 4/1997 | Katta et al. | |
| 6,521,799 | 4/1997 | Katta et al. | |
| 5,673,319 A | * 9/1997 | Bellare et al. | 713/181 |
| 5,825,879 A | 10/1998 | Davis | |
| 5,852,472 A | 12/1998 | Prasad et al. | |
| 5,862,150 A | 1/1999 | Lavelle et al. | |
| 5,940,509 A | * 8/1999 | Jovanovich et al. | 380/249 |
| 6,005,940 A | 12/1999 | Kulinets | |
| 6,061,449 A | * 5/2000 | Candelore et al. | 380/28 |
| 6,167,136 A | 12/2000 | Chou | |

FOREIGN PATENT DOCUMENTS

| | | | |
|---|---|---|---|
| EP | 0 599 366 | 2/1993 | |
| WO | WO 96/06504 | 2/1996 | |
| WO | WO 99/18729 | 4/1999 | |
| WO | 99/19822 | * 4/1999 | ............. H04L/9/08 |
| WO | WO 01/17251 | 3/2001 | |

OTHER PUBLICATIONS

Gustavus J. Simmons, Symmetric and Asymmetric Encryption, 1979, Computing Surveys, vol. 11,pp.306–318.*

Howard M.Heys,Delay Characteristics of Statistical Cipher Feedback Mode,2001 IEEE,pp. 5–9.*

(List continued on next page.)

Primary Examiner—Gail Hayes
Assistant Examiner—Ho S. Song
(74) Attorney, Agent, or Firm—Blakely, Sokoloff, Taylor & Zafman LLP (57) ABSTRACT

A video source device provides a basis value to a symmetric ciphering/deciphering process to a video sink device, to which the video source device is to provide a video content. The video source device ciphers the video content for transmission to the video sink device, including generation of a first cipher key through functional transformation of the basis value. The video source device further verifies periodically that the transmitted video content is indeed being symmetrically deciphered by the video sink device. The video sink device practices symmetric deciphering, including generation of a first decipher key through functional transformation of the basis value. The video sink device also provides verification values to the video source device to facilitate confirmation of symmetric deciphering. In one embodiment, the video source and sink devices further authenticate each other, including generation of an authentication key, which is used in the generation of the first cipher/decipher key.

70 Claims, 5 Drawing Sheets

U.S. PATENT DOCUMENTS

Howard M.Heys, An Analysis of the statistical Self–Synchronization of Stream Ciphers,2001 IEEE,pp.897–902.*

Written Opinion PCT/US00/22785. Mailed Jul. 13, 2001. 5 Pages.

Written Opinion PCT/US00/22834. Mailed Jun. 28, 2001, 5 Pages.

International Preliminary Examination Report PCT/US00/22834. 6 Pages. Mailed Nov. 19, 2001.

International Preliminary Examination Report PCT/US00/22785. 7 Pages. Mailed Nov. 5, 2001.

Bruce Schneier, "Applied Cryptography: protocols, algorithms, and source code in C", Second Edition, Library of Congress, Copyright 1996, Chapters 2–6 and 12–17.

Search Report for PCT/US 00/22834, mailed Dec. 4, 2000, 2 pages.

Search Report for PCT/US 00/22785, mailed Dec. 6, 2000, 2 pages.

* cited by examiner

DIGITAL VIDEO CONTENT TRANSMISSION CIPHERING AND DECIPHERING METHOD AND APPARATUS

BACKGROUND OF THE INVENTION

1. Field of the Invention

The present invention relates to the field of content protection. More specifically, the present invention addresses the provision of protection to digital video content to facilitate their secure transmission from a video source device to a video sink device.

2. Background Information

In general, entertainment, education, art, and so forth (hereinafter collectively referred to as "content") packaged in digital form offer higher audio and video quality than their analog counterparts. However, content producers, especially those in the entertainment industry, are still reluctant in totally embracing the digital form. The primary reason being digital contents are particularly vulnerable to pirating. Unlike the analog form, where some amount of quality degradation generally occurs with each subsequent copy, a pirated copy of digital content is virtually as good as the "gold master". As a result, much effort has been spent by the industry in developing and adopting techniques to provide protection to the distribution and rendering of digital content.

Historically, the communication interface between a video source device (such as a personal computer) and a video sink device (such as a monitor) is an analog interface. Thus, very little focus has been given to providing protection for the transmission between the source and sink devices. With advances in integrated circuit and other related technologies, a new type of digital interface between video source and sink devices is emerging. The availability of this type of new digital interface presents yet another new challenge to protecting digital video content. While in general, there is a large body of cipher technology known, the operating characteristics such as the volume of the data, its streaming nature, the bit rate and so forth, as well as the location of intelligence, typically in the source device and not the sink device, present a unique set of challenges, requiring novel solutions.

SUMMARY OF THE INVENTION

A video source device provides a basis value to a symmetric ciphering/deciphering process to a video sink device, to which the video source device is to provide video content. The video source device ciphers the video content for transmission to the video sink device, including generation of a first cipher key through functional transformation of the basis value. The video source device further verifies periodically that the transmitted video content is indeed being symmetrically deciphered by the video sink device.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well-known features are omitted or simplified.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
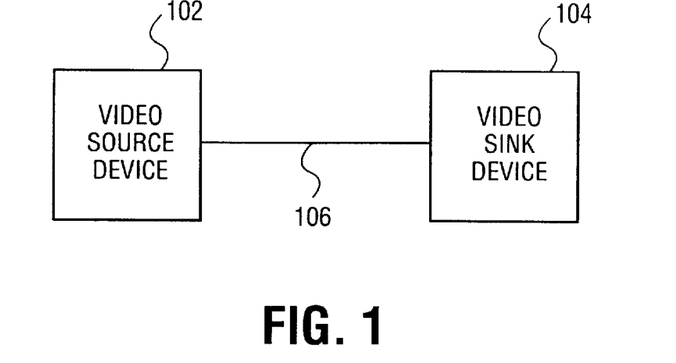
FIG. 1 illustrates an overview of the present invention in accordance with one embodiment.

Referring now to FIG. 1, a block diagram illustrating an overview of the present invention, in accordance with one embodiment is shown. As illustrated, video source device 102 and video sink device 104 are coupled to each other by digital video link 106. Video source device 102 provides video content to video sink device 104 through digital video link 106. In accordance with the present invention, video source device 102 and video sink device 104 are equipped to be able to jointly practice a symmetric ciphering/deciphering process. As a result, video content may be provided in a more robust ciphered digital form from video source device 102 to video sink device 104 through video link 106, making it more difficult to pirate video content during transmission.

Except for the teachings of the present invention, to be described more fully below, video source device 102 and video sink device 104 are both intended to represent a broad range of such devices known in the art. Examples of video source devices include but are not limited to computers of all sizes (from palm size device to desktop device, and beyond), set-up boxes, or DVD players, whereas examples of video sink devices include but are not limited to CRT monitors, flat panel displays or television sets. Digital video link 106 may be implemented in any one of a number of mechanical and electrical forms, as long as they are consistent with the operating requirement (i.e. speed, bit rate and so forth), and a mechanism (which may be in hardware or through protocol) is provided to allow control information to be exchanged between video source and sink devices 102 and 104 (hereinafter, simply source and sink devices respectively).

Figure 2:
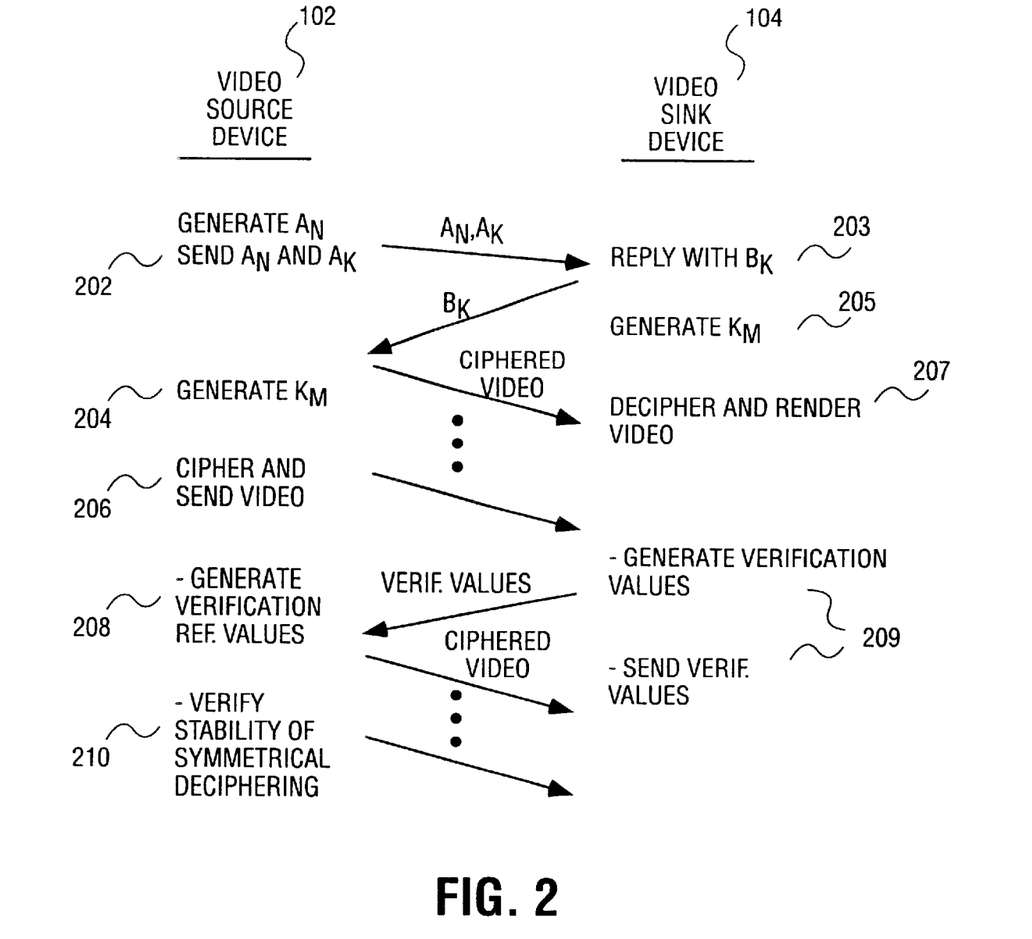
FIG. 2 illustrates a symmetric ciphering/deciphering process based method for providing video content from a source device to a sink device, in accordance with one embodiment.

FIG. 2 illustrates an overview of the symmetric ciphering/deciphering process based method for providing video content from a source device to a sink device, in accordance with one embodiment. In this embodiment, source and sink devices 102 and 104 are assumed to have each been provided with an array of private keys and a complementary identifier by a certification authority. As illustrated, upon power on or reset, source device 102 first provides a basis value to the symmetric ciphering/deciphering process to sink device 104 (block 202). For the illustrated embodiment, the basis value is a random number ($A_n$). $A_n$ may be generated according to any one of a number of techniques known in the art. Additionally, source device 102 also provides its identifier ($A_k$) to sink device 104 (block 202). In response, sink device 104 replies with its identifier ($B_k$) (block 203). Upon exchanging the above information, source and sink devices 102 and 104 independently generate their respective copies of an authentication key ($K_m$) using $A_k$ and $B_k$ (block 204 and 205). For the illustrated embodiment, source device 102 generates its copy of $K_m$ by summing private keys of its provided array indexed by $B_k$, while sink device 104 generates its copy of $K_m$ by summing private keys of its provided array indexed by $A_k$. At this time, if both source and sink devices 102 and 104 are authorized devices, they both possess and share a common secret authentication key $K_m$.

In one embodiment, each of source and sink devices 102 and 104 is pre-provided with an array of 40 56-bit private keys by the certification authority. $A_n$ is a 64-bit random number, and $K_m$ is 56-bit long. For more information on the above described authentication process, see co-pending U.S. patent application, Ser. No. 09/275,722, filed on Mar. 24, 1999, entitled Method and Apparatus for the Generation of Cryptographic Keys, having common inventorship as well as assignee with the present application.

Having authenticated sink device 104, source device 102 ciphers video content into a ciphered form before transmitting the video content to sink device 104. Source device 102 ciphers the video content employing a symmetric ciphering/deciphering process, and using the random number ($A_n$) as well as the independently generated authentication key ($K_m$) (block 206). Upon receipt of the video content in ciphered form, sink device 104 deciphers the ciphered video content employing the same symmetric ciphering/deciphering processing, and using the provided $A_n$ as well as its independently generated copy of $K_m$ (block 207).

In accordance with the present invention, as an integral part of ciphering video content, source device 102 derives a set of verification reference values in a predetermined manner (block 208). Likewise, as an integral part of symmetrically deciphering video content sink device 104 also derives a set of verification values in a predetermined manner, and transmits these derived verification values to source device 102 (block 209). Upon receiving each of these verification values, source device 102 compares the received verification value to the corresponding one of the verification reference value to determine and confirm that indeed the ciphered video content is being properly deciphered by sink device 104 (block 210).

For the illustrated embodiment, both source and sink devices 102 and 104 generate the verification reference and verification values continuously, but the verification values are provided from sink device 104 to source device 102 periodically at predetermined intervals.

In one embodiment, the verification reference and verification values are all 64-bit in length, and sink device 104 provides source device 102 with verification values at initialization and every $64^{th}$ frame thereafter.

Figure 3A:
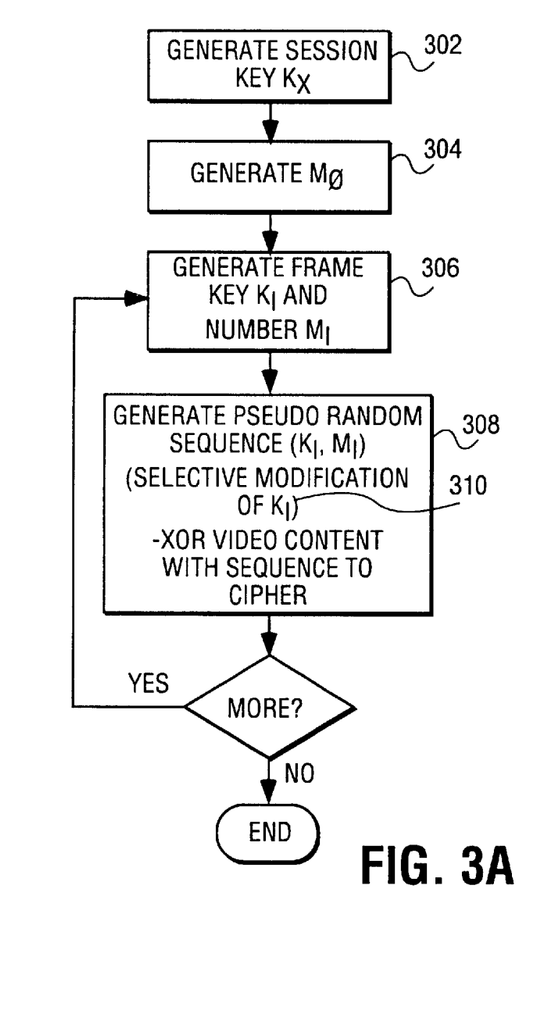
FIGS. 3a–3b illustrate the symmetric ciphering/deciphering process of FIG. 2, in accordance with one embodiment.
Figure 3B:
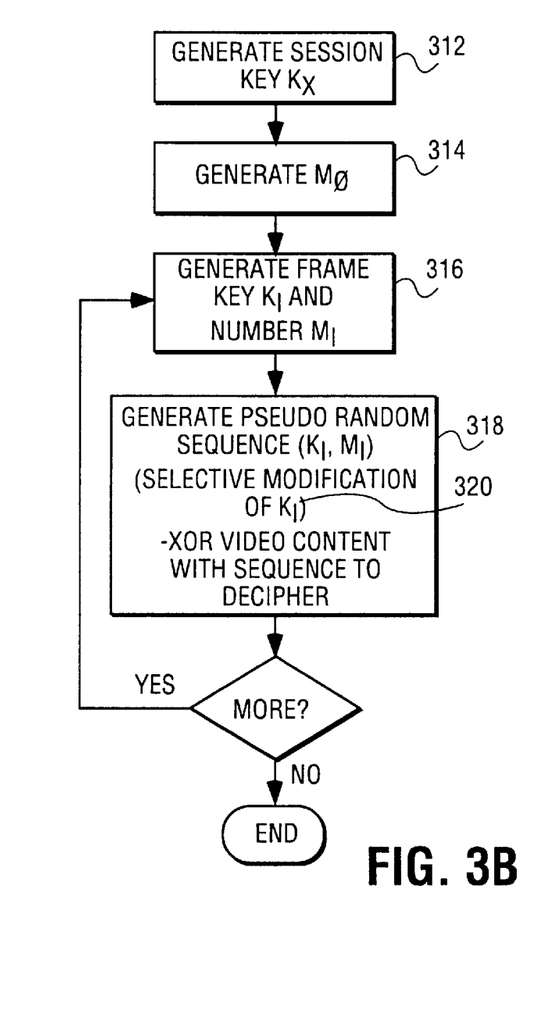

FIGS. 3a–3b illustrate the symmetric ciphering/deciphering process in further detail, in accordance with one embodiment. In this embodiment, the video content is assumed to be a multi-frame video content with each frame having multiple lines of video content. In between two lines of a frame is an interval to allow a sink device to horizontally "retrace" itself, commonly known as the horizontal retrace interval or horizontal blanking interval (HBI). Likewise, in between two frames is an interval to allow a sink device to vertically "retrace" itself, commonly known as the vertical retrace interval or vertical blanking interval (VBI).

Source device 102 first generates a session key $K_x$, is generated by block ciphering the above mentioned random number $A_n$ using the authentication key $K_m$ as the block cipher key and applying C1 clocks. The duration of a transmission session is application dependent. Typically, it corresponds to a natural demarcation of the video content, e.g. the transmission of a single movie may constitute a transmission session, or the transmission of an episode of a sitcom may constitute a transmission session instead.

Upon generating the session key $K_x$, source device 102 generates an initial version of a second random number ($M_0$) (block 304). For the illustrated embodiment, source device 102 first generates a pseudo random bit sequence (at p-bits per clock) using a stream cipher with the above described random number $A_n$ and the session key $K_x$, (in two roles, as another input random number and as the stream cipher key), applying C2 clocks. Source device 102 derives $M_0$ from the pseudo random bit sequence, as the bit sequence is generated.

Next, source device 102 generates a frame key ($K_i$) for the next frame (block 306). For the illustrated embodiment, $K_i$ is generated by block ciphering an immediately preceding version of the second random number $M_i$–1using the session key $K_x$ as the block cipher key, and applying C3 clocks. That is, for the first frame, frame-1, frame key K1, is generated by block ciphering the above described initial version of the second random number $M_0$, using, and applying C3 clocks. Additionally, this operation is subsequently repeated at each vertical blanking interval for the then next frame, frame-2, frame-3, and so forth.

Upon generating the frame key $K_i$, source device 102 generates the current version of the second random number $M_i$ (block 302). For the illustrated embodiment, source device 102 first generates a pseudo random bit sequence (at p-bits per clock) using a stream cipher with the previous version of the second random number $M_i$–1 and the frame key $K_i$ (in two roles, as another input random number and as the stream cipher key), applying C4 clocks. Source device 102 derives $M_i$ from the pseudo random bit sequence, as the bit sequence is generated.

Upon generating the current version of the second random number $M_i$, source device 102 again generates a pseudo random bit sequence (at p-bits per clock) to cipher the frame (block 308). For the illustrated embodiment, source device 102 generates the pseudo random bit sequence using a stream cipher with an immediately preceding version of the second random number $M_i$–1 and frame key $K_i$ (in two roles, as another input random number and the stream cipher key), applying C5 clock cycles. The video content is ciphered by performing an exclusive-OR (XOR) operation on the video stream and the pseudo random bit sequence. The pseudo random bit sequence is generated preferably at a rate sufficient to cipher a pixel of RGB signal per clock. Therefore, C5 is equal to the number of bits per pixel multiplied by the number of pixels per line, as well as the number of lines per frame.

For the illustrated embodiment, a stream cipher that successively $M_i$ and $K_i$ in the course of generating the pseudo random bit sequence is employed. Additionally, the robustness of the ciphered video content is further strengthened by increasing the unpredictability of the pseudo random bit sequence through successive modification of the current states of $K_i$ at the horizontal blanking intervals of the frame (block 310).

Over in sink device 104, in like manner, it first generates a session key ($K_x$,) for the transmission session (block 312). Upon generating the session key $K_x$, sink device 104 generates an initial version of the second random number ($M_0$) (block 314). Next, sink device 104 generates the frame key $K_i$ and second random number ($M_i$) for the next frame (block 316). This operation is likewise subsequently repeated at each vertical blanking interval for the then next frame. In the meantime, after generation of each frame key $K_i$ and $M_s$, sink device 104 generates a corresponding pseudo random bit sequence to decipher the frame (block 318). The ciphered video content is deciphered by performing an exclusive-OR (XOR) operation on the video stream and the corresponding pseudo random bit sequence. Sink device 104 also employs a stream cipher that successively transforms $M_i$ and $K_i$ in the course of generating the pseudo random bit sequence. Furthermore, $K_i$ is successively modified at the horizontal blanking intervals of the frame (block 320). $K_i$, the pseudo random bit sequence, and $M_i$ are symmetrically generated as earlier described for source device 102.

In one embodiment, $K_x$ and each $K_i$ are both 84-bit in length. C1 and C3 are both 48 clocks in length. Each pixel is 24-bits, and the pseudo random bit sequence is generated at 24-bits per clock. Each $M_i$ is 64-bits in length, C3 and C4 are 56 clocks in length. Each 64-bit $M_i$ is formed by concatenating the "lower" 16-bit stream cipher output of each of the last four clocks.

Accordingly, video content may be advantageously transmitted in ciphered form with increased robustness from source device 102 to sink device 104 through link 106 with reduced pirating risk.

Figure 4:
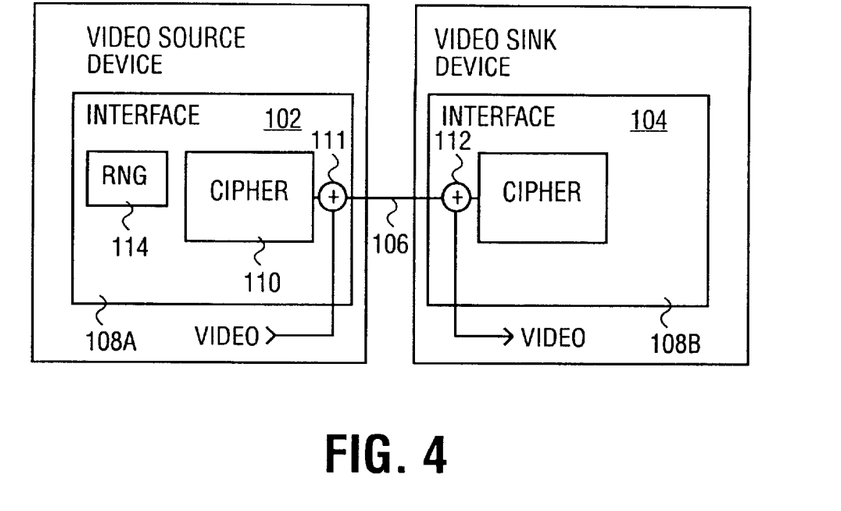
FIG. 4 illustrates video source and sink devices of FIG. 1 in further detail, in accordance with one embodiment.

FIG. 4 illustrates video source and sink devices of FIG. 1 in further detail, in accordance with one embodiment. As shown, video source and sink devices 102 and 104 include interfaces 108a and 108b disposed at the respective end of link 106. Each of interfaces 108a and 108b is advantageously provided with cipher 110 of the present invention and XOR 112 to practice the video content protection method of the present invention as described above. Additionally, for ease of explanation, interface 108a is also shown as having been provided with a separate random number generator 114. Except for interfaces 108a and 108b, as stated earlier, video source and sink devices 102 and 104 are otherwise intended to represent a broad category of these devices known in the art.

Random number generator 114 is used to generate the earlier described random number $A_n$. Random number generator 114 may be implemented in hardware or software, in any one of a number of techniques known in the art. In alternate embodiments, as those skilled in the art will appreciate from the description to follow, cipher 110 may also used to generate $A_n$, without employ a separate random number generator.

Cipher 110 is a novel combined block/stream cipher capable of operating in either a block mode of operation or a stream mode of operation. To practice the video content protection method of the present invention, cipher 110 is used in block mode to generate the above described session key $K_x$, and frame keys $K_i$, and in stream mode to generate the pseudo random bit sequences for the various frames (and indirectly Mi, as they are derived from the respective bit sequences).

In source device 102, XOR 112 is used to cipher video content, combining it with the pseudo random bit sequences generated by cipher 110 on interface 108a. Over in sink device 104, XOR 112 is used to decipher ciphered video content, combining it with the pseudo random bit sequences generated by cipher 110 on interface 108b.

Figure 5:
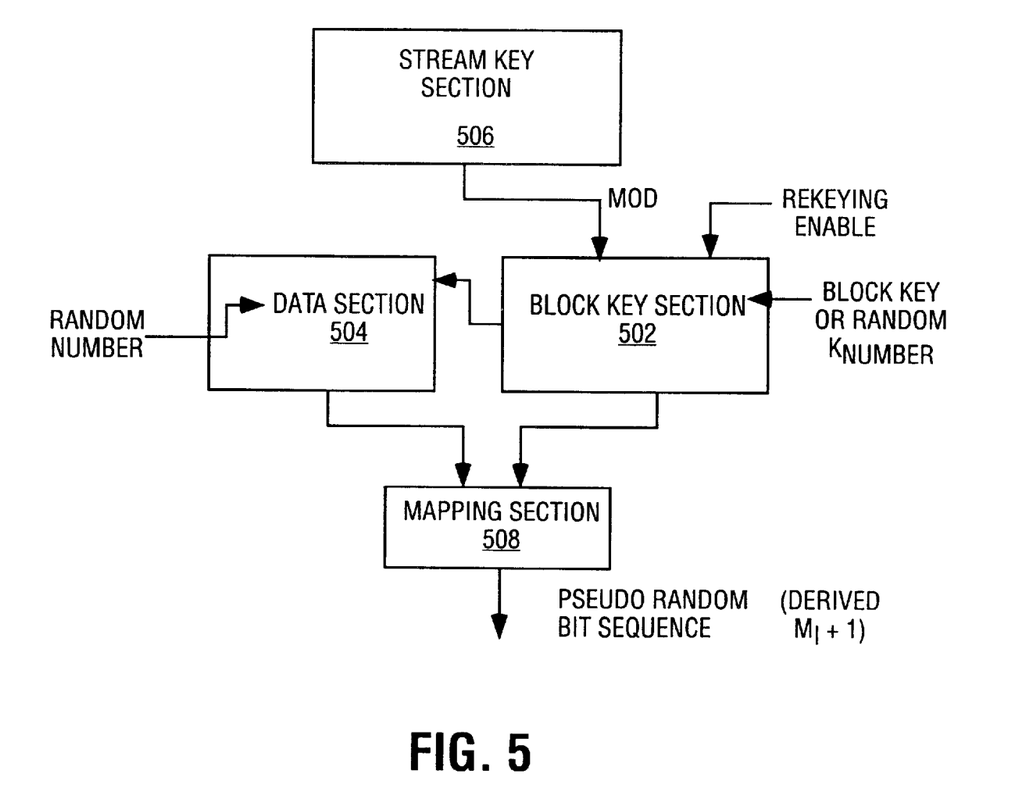
FIG. 5 illustrates the combined block/stream cipher of FIG. 4 in further detail, in accordance with one embodiment.

FIG. 5 illustrates the combined block/stream cipher of FIG. 4 in further detail, in accordance with one embodiment. As illustrated, combined block/stream cipher 110 includes block key section 502, data section 504, stream key section 506, and mapping section 508, coupled to one another. Block key section 502 and data section 504 are employed in both the block mode as well as the stream mode of operation, whereas stream key section 506 and mapping section 508 are employed only in the stream mode of operation.

Briefly, in block mode, block key section 502 is provided with a block cipher key, such as the earlier described authentication key $K_m$ or the session key $K_x$; whereas data section 504 is provided with the plain text, such as the earlier described random number $A_n$ or the derived random number $M_i-1$. "Rekeying enable" signal is set to a "disabled" state, operatively de-coupling block key section 502 from stream key section 506. During each clock cycle, the block cipher key as well as the plain text are transformed. The block cipher key is independently transformed, whereas transformation of the plain text is dependent on the transformation being performed on the block cipher key. After a desired number of clock cycles, the provided plain text is transformed into ciphered text. For the earlier described video content protection method, when block key section 502 is provided with $K_m$ and data section 504 is provided with the $A_n$, ciphered $A_n$ is read out and used as the session key $K_s$. When block key section 502 is provided with $K_s$ and data section 504 is provided with the $M_i-1$, ciphered $M_i-1$ is read out and used as the frame key $K_i$.

To decipher the ciphered plain text, block key section 502 and data section 504 are used in like manner as described above to generate the intermediate "keys", which are stored away (in storage locations not shown). The stored intermediate "keys" are then applied to the ciphered text in reversed order, resulting in the deciphering of the ciphered text back into the original plain text. Another approach to deciphering the ciphered text will be described after block key section 502 and data section 504 have been further described in accordance with one embodiment each, referencing FIGS. 6–7.

In stream mode, stream key section 506 is provided with a stream cipher key, such as the earlier described session key $K_x$ or frame key $K_i$. Block key section 502 and data section 504 are provided with random numbers, such as the earlier described session/frame keys $K_x$/$K_i$ and the derived random numbers $M_i-1$. "Rekeying enable" signal is set to an "enabled" state, operatively coupling block key section 502 to stream key section 506. Periodically, at predetermined intervals, such as the earlier described horizontal blanking intervals, stream key section 506 is used to generate one or more data bits to dynamically modify the then current state of the random number stored in block data section 502. During each clock cycle, in between the predetermined intervals, both random numbers stored in block key section 502 and data section 504 are transformed.

For the illustrated embodiment, by virtue of the employment of the "rekeying enable" signal, stream key section 506 may be left operating even during the block mode, as its outputs are effectively discarded by the "rekeying enable" signal (set in a "disabled" state). The random number provided to block key section 502 is independently transformed, whereas transformation of the random number provided to data section 504 is dependent on the transformation being performed in block key section 502. Mapping block 506 retrieves a subset each, of the newly transformed states of the two random numbers, and reduces them to generate one bit of the pseudo random bit sequence. Thus, in a desired number of clock cycles, a pseudo random bit sequence of a desired length is generated.

Figure 6:
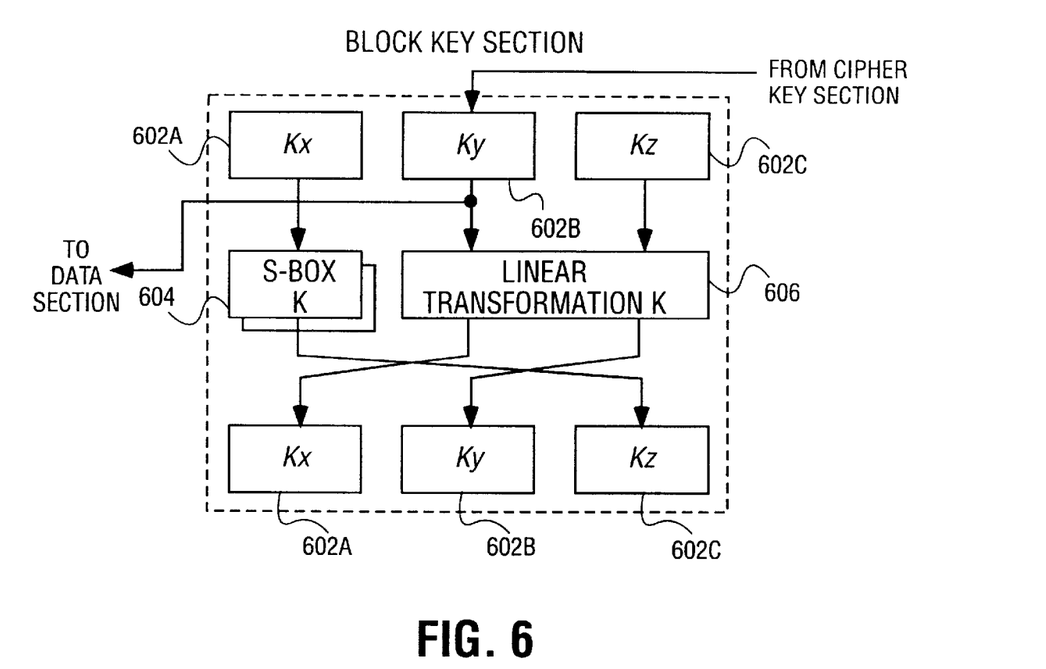
FIG. 6 illustrates the block key section of FIG. 5 in further detail, in accordance with one embodiment.
Figure 7:
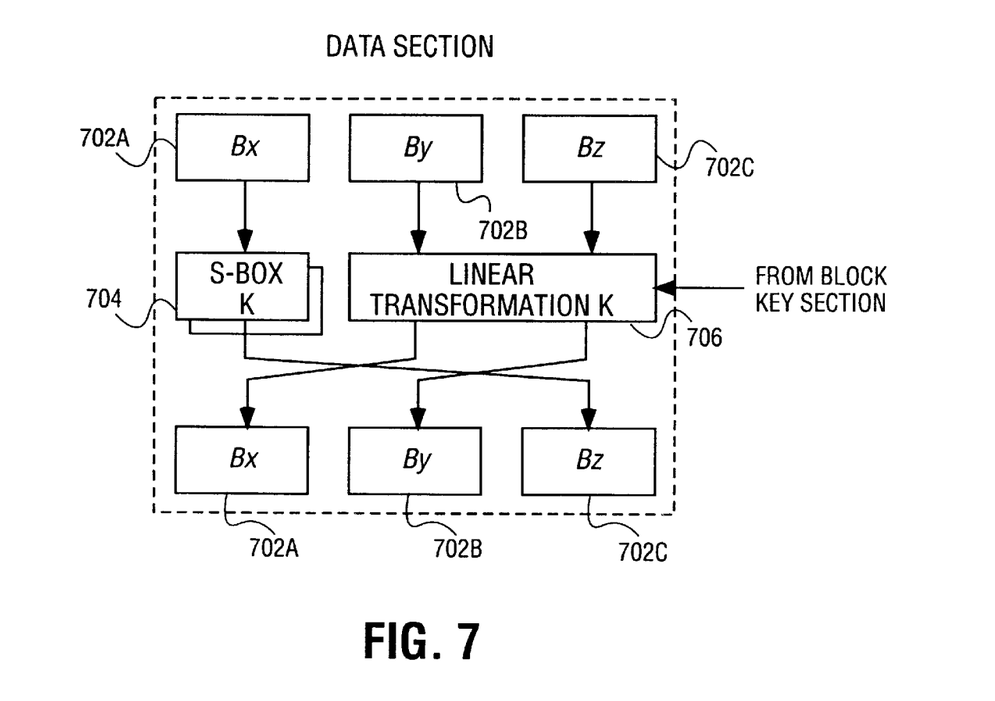
FIG. 7 illustrates the block data section of FIG. 5 in further detail, in accordance with one embodiment.

FIG. 6 illustrates the block key section of FIG. 5 in further detail, in accordance with one embodiment. As illustrated, block key section 502 includes registers 602a–602c, substitution boxes 604, and linear transformation unit 606. In block mode, registers 602a–602c are collectively initialized to a block cipher key, e.g. authentication $K_m$ or session key $K_s$. In stream mode, registers 602a–602c are collectively initialized to a random number, e.g. session key $K_s$ or frame key $K_i$. Each round, substitution boxes 604 and linear transformation unit 606 modify the content of registers 602a–602c. More specifically, substitution boxes 604 receive the content of register 602a, modify it, and then store the substituted content into register 602c. Similarly, linear transformation unit 606 receives the content of registers 602b and 602c, linearly transforms them, and then correspondingly stores the linearly transformed content into registers 602a and 602b.

initialized with a random number. Each round, substitution boxes 704 and linear transformation unit 706 modify the content of registers 702a–702c as described earlier for block key section 502 except for the differences noted above.

Again, substitution boxes 604 and linear transformation unit 606 may be implemented in a variety of ways in accordance with well known cryptographic principles.

In one implementation for the above described embodiment, each register 602a, 602b, 602c, 702a, 702b, 702c is 28-bits wide. [Whenever registers 602a–602c or 702a–702cb are collectively initialized with a key value or random number less than 84 bits, the less than 84-bit number is initialized to the lower order bit positions with the higher order bit positions zero filled.] Additionally, each set of substitution boxes 604 or 704 are constituted with seven 4 input by 4 output substitution boxes. Each linear transformation unit 606 or 706 produces 56 output values by combining outputs from eight diffusion networks (each producing seven outputs). More specifically, the operation of substitution boxes 604/704 and linear transformation unit 606/706 are specified by the four tables to follow. For substitution boxes 604/704, the Ith input to box J is bit I*7+J of register 602a/702a, and output I of box J goes to bit I*7+j of register 602c/702c. [Bit 0 is the least significant bit.] For each diffusion network (linear transformation unit 606 as well as 706), the inputs are generally labeled [I0–I6] $I_0$–$I_6$ and the outputs are labeled [O0–O6] $O_0$–$O_6$. The extra inputs for each diffusion network of the linear transformation unit 706 is labeled $K_0$–$K_6$.

TABLE I

Substitution performed by each of the seven constituting substitution boxes of substitution boxes 604/704.

|    | 0  | 1  | 2  | 3  | 4  | 5  | 6  | 7  | 8  | 9  | 10 | 11 | 12 | 13 | 14 | 15 |
|----|----|----|----|----|----|----|----|----|----|----|----|----|----|----|----|----|
| SK | 8  | 14 | 5  | 9  | 3  | 0  | 12 | 6  | 1  | 11 | 15 | 2  | 4  | 7  | 10 | 13 |
| SK | 1  | 6  | 4  | 15 | 8  | 3  | 11 | 5  | 10 | 0  | 9  | 12 | 7  | 13 | 14 | 2  |
| SK | 13 | 11 | 8  | 6  | 7  | 4  | 2  | 15 | 1  | 12 | 14 | 0  | 10 | 3  | 9  | 5  |
| SK | 0  | 14 | 11 | 7  | 12 | 3  | 2  | 13 | 15 | 4  | 8  | 1  | 9  | 10 | 5  | 6  |
| SK | 12 | 7  | 15 | 8  | 11 | 14 | 1  | 4  | 6  | 10 | 3  | 5  | 0  | 9  | 13 | 2  |
| SK | 1  | 12 | 7  | 2  | 8  | 3  | 4  | 14 | 11 | 5  | 0  | 15 | 13 | 6  | 10 | 9  |
| SK | 10 | 7  | 6  | 1  | 0  | 14 | 3  | 13 | 12 | 9  | 11 | 2  | 15 | 5  | 4  | 8  |
| SB | 12 | 9  | 3  | 0  | 11 | 5  | 13 | 6  | 2  | 4  | 14 | 7  | 8  | 15 | 1  | 10 |
| SB | 3  | 8  | 14 | 1  | 5  | 2  | 11 | 13 | 10 | 4  | 9  | 7  | 6  | 15 | 12 | 0  |
| SB | 7  | 4  | 1  | 10 | 11 | 13 | 14 | 3  | 12 | 15 | 6  | 0  | 2  | 8  | 9  | 5  |
| SB | 6  | 3  | 1  | 4  | 10 | 12 | 15 | 2  | 5  | 14 | 11 | 8  | 9  | 7  | 0  | 13 |
| SB | 3  | 6  | 15 | 12 | 4  | 1  | 9  | 2  | 5  | 8  | 10 | 7  | 11 | 13 | 0  | 14 |
| SB | 11 | 14 | 6  | 8  | 5  | 2  | 12 | 7  | 1  | 4  | 15 | 3  | 10 | 13 | 9  | 0  |
| SB | 1  | 11 | 7  | 4  | 2  | 5  | 12 | 9  | 13 | 6  | 8  | 15 | 14 | 0  | 3  | 10 |

Substitution boxes 604 and linear transformation unit 606 may be implemented in a variety of ways in accordance with well known cryptographic principles. One specific implementation is given in more detail below after the description of FIG. 7.

FIG. 7 illustrates the block data section of FIG. 5 in further detail, in accordance with one embodiment. For the illustrated embodiment, data section 504 is similarly constituted as block key section 502, except linear transformation unit 706 also takes into consideration the content of register 602b, when transforming the contents of registers 702b–702c. In block mode, registers 702a–702c are collectively initialized with the target plain text, e.g. earlier described random number $A_n$ or derived random number $M_i$−1. In stream mode, registers 702a–702c are collectively

| Diffusion Network Logic Function |
|---|
| $O_0$    $K_0 \oplus I_1 \oplus I_2 \oplus I_3 \oplus I_4 \oplus I_5 \oplus I_6$ |
| $O_1$    $K_0 \oplus I_1 \oplus I_2 \oplus I_3 \oplus I_4 \oplus I_5 \oplus I_6$ |
| $O_2$    $K_0 \oplus I_1 \oplus I_2 \oplus I_3 \oplus I_4 \oplus I_5 \oplus I_6$ |
| $O_3$    $K_0 \oplus I_1 \oplus I_2 \oplus I_3 \oplus I_4 \oplus I_5 \oplus I_6$ |
| $O_4$    $K_0 \oplus I_1 \oplus I_2 \oplus I_3 \oplus I_4 \oplus I_5 \oplus I_6$ |
| $O_5$    $K_0 \oplus I_1 \oplus I_2 \oplus I_3 \oplus I_4 \oplus I_5 \oplus I_6$ |

-continued

| | Diffusion Network Logic Function |
|---|---|
| $O_6$ | $K_0 \oplus I_1 \oplus I_2 \oplus I_3 \oplus I_4 \oplus I_5 \oplus I_6$ |

| | $K_1$ | $K_2$ | $K_3$ | $K_4$ | $K_5$ | $K_6$ | $K_7$ | $K_8$ |
|---|---|---|---|---|---|---|---|---|
| $I_0$ | Kz0 | Ky0 | Ky4 | Ky8 | Ky12 | Ky16 | Ky20 | Ky24 |
| $I_1$ | Kz1 | Ky1 | Ky5 | Ky9 | Ky13 | Ky17 | Ky21 | Ky25 |
| $I_2$ | Kz2 | Ky2 | Ky6 | Ky10 | Ky14 | Ky18 | Ky22 | Ky26 |
| $I_3$ | Kz3 | Ky3 | Ky7 | Ky11 | Ky15 | Ky19 | Ky23 | Ky27 |
| $I_4$ | Kz4 | Kz7 | Kz10 | Kz13 | Kz16 | Kz19 | Kz22 | Kz25 |
| $I_5$ | Kz5 | Kz8 | Kz11 | Kz14 | Kz17 | Kz20 | Kz23 | Kz26 |
| $I_6$ | Kz6 | Kz9 | Kz12 | Kz15 | Kz18 | Kz21 | Kz24 | Kz27 |
| $O_0$ | Kx0 | Ky0 | Ky1 | Ky2 | Ky3 | Kx7 | Kx8 | Kx9 |
| $O_1$ | Kx1 | Ky4 | Ky5 | Ky6 | Ky7 | Kx10 | Kx11 | Kx12 |
| $O_2$ | Kx2 | Ky8 | Ky9 | Ky10 | Ky11 | Kx13 | Kx14 | Kx15 |
| $O_3$ | Kx3 | Ky12 | Ky13 | Ky14 | Ky15 | Kx16 | Kx17 | Kx18 |
| $O_4$ | Kx4 | Ky16 | Ky17 | Ky18 | Ky19 | Kx19 | Kx20 | Kx21 |
| $O_5$ | Kx5 | Ky20 | Ky21 | Ky22 | Ky23 | Kx12 | Kx23 | Kx24 |
| $O_6$ | Kx6 | Ky24 | Ky25 | Ky26 | Ky27 | Kx25 | Kx26 | Kx27 |

Tables II & III—Diffusion networks for linear transformation unit 606/706 continued Table IV).

| | $B_1$ | $B_2$ | $B_3$ | $B_4$ | $B_5$ | $B_6$ | $B_7$ | $B_8$ |
|---|---|---|---|---|---|---|---|---|
| $I_0$ | $B_{z0}$ | $B_{y0}$ | $B_{y4}$ | $B_{y8}$ | $B_{y12}$ | $B_{y16}$ | $B_{y20}$ | $B_{y24}$ |
| $I_1$ | $B_{z1}$ | $B_{y1}$ | $B_{y5}$ | $B_{y9}$ | $B_{y13}$ | $B_{y17}$ | $B_{y21}$ | $B_{y25}$ |
| $I_2$ | $B_{z2}$ | $B_{y2}$ | $B_{y6}$ | $B_{y10}$ | $B_{y14}$ | $B_{y18}$ | $B_{y22}$ | [$B_{y26}$ |
| $I_3$ | $B_{z3}$ | $B_{y3}$ | $B_{y7}$ | $B_{y11}$ | $B_{y15}$ | $B_{y19}$ | $B_{y23}$ | $B_{y27}$ |
| $I_4$ | $B_{z4}$ | $B_{z7}$ | $B_{z10}$ | $B_{z13}$ | $B_{z16}$ | $B_{z19}$ | $B_{z22}$ | $B_{z25}$ |
| $I_5$ | $B_{z5}$ | $B_{z8}$ | $B_{z11}$ | $B_{z14}$ | $B_{z17}$ | $B_{z20}$ | $B_{z23}$ | $B_{z26}$ |
| $I_6$ | $B_{z6}$ | $B_{z9}$ | $B_{z12}$ | $B_{z15}$ | $B_{z18}$ | $B_{z21}$ | $B_{z24}$ | $B_{z27}$ |
| $K_0$ | $K_{y0}$ | — | — | — | — | $K_{y7}$ | $K_{y14}$ | $K_{y21}$ |
| $K_1$ | $K_{y1}$ | — | — | — | — | $K_{y8}$ | $K_{y15}$ | $K_{y22}$ |
| $K_2$ | $K_{y2}$ | — | — | — | — | $K_{y9}$ | $K_{y16}$ | $K_{y23}$ |
| $K_3$ | $K_{y3}$ | — | — | — | — | $K_{y10}$ | $K_{y17}$ | $K_{y24}$ |
| $K_4$ | [$K_{y4}$ ]$K_{y4}$ | — | — | — | — | $K_{y11}$ | $K_{y18}$ | $K_{y25}$ |
| $K_5$ | [$K_{y5}$ ]$K_{y5}$ | — | — | — | — | $K_{y12}$ | $K_{y19}$ | $K_{y26}$ |
| $K_6$ | [$K_{y6}$ ]$K_{y6}$ | — | — | — | — | $K_{y13}$ | $K_{y20}$ | $K_{y27}$ |
| $O_0$ | $B_{x0}$ | $B_{y0}$ | $B_{y1}$ | $B_{y2}$ | $B_{y3}$ | $B_{x7}$ | $B_{x8}$ | [$B_{x9}$ |
| $O_1$ | $B_{x1}$ | $B_{y4}$ | $B_{y5}$ | $B_{y6}$ | $B_{y7}$ | $B_{x10}$ | $B_{x11}$ | $B_{x12}$ |
| $O_2$ | $B_{x2}$ | $B_{y8}$ | $B_{y9}$ | $B_{y10}$ | $B_{y11}$ | $B_{x13}$ | $B_{x14}$ | $B_{x15}$ |
| $O_3$ | $B_{x3}$ | $B_{y12}$ | $B_{y13}$ | $B_{y14}$ | $B_{y15}$ | $B_{x16}$ | $B_{y17}$ | $B_{y18}$ |
| $O_4$ | $B_{x4}$ | $B_{y16}$ | $B_{y17}$ | $B_{y18}$ | $B_{y19}$ | $B_{x19}$ | $B_{x20}$ | $B_{x21}$ |
| $O_5$ | $B_{x5}$ | $B_{y20}$ | $B_{y21}$ | $B_{y22}$ | $B_{y23}$ | $B_{y22}$ | $B_{y23}$ | $B_{x24}$ |
| $O_6$ | $B_{x6}$ | $B_{y24}$ | $B_{y25}$ | $B_{y26}$ | $B_{y27}$ | $B_{x25}$ | $B_{x26}$ | $B_{x27}$ |

Table IV—Diffusion networks for linear transformation unit 606/706 (continued Table II & III).

Referring back to FIG. 5, recall that a ciphered text may be deciphered by generating the intermediate "keys" and applying them backward. Alternatively, for an embodiment where either the inverse of substitution boxes 604/704 and linear transformation units 606/706 are included or may be dynamically reconfigured to operate in an inverse manner, the ciphered text may be deciphered as follows. First, the cipher key used to cipher the plain text is loaded into block key section 502, and block key section 502 is advanced by R-1 rounds, i.e. one round short of the number of rounds (R) applied to cipher the plain text. After the initial R-1 rounds, the ciphered text is loaded into data section 504, and both sections, block key section 502 and data section 504, are operated "backward", i.e. with substitution boxes 604/704 and linear transformation units 606/706 applying the inverse substitutions and linear transformations respectively.

Figure 8A:
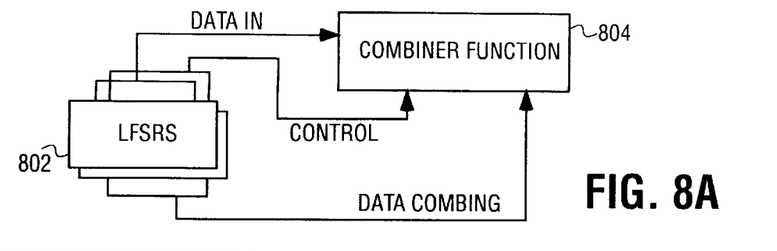
FIGS. 8a–8c illustrate the stream data section of FIG. 5 in further detail, in accordance with one embodiment.
Figure 8B:
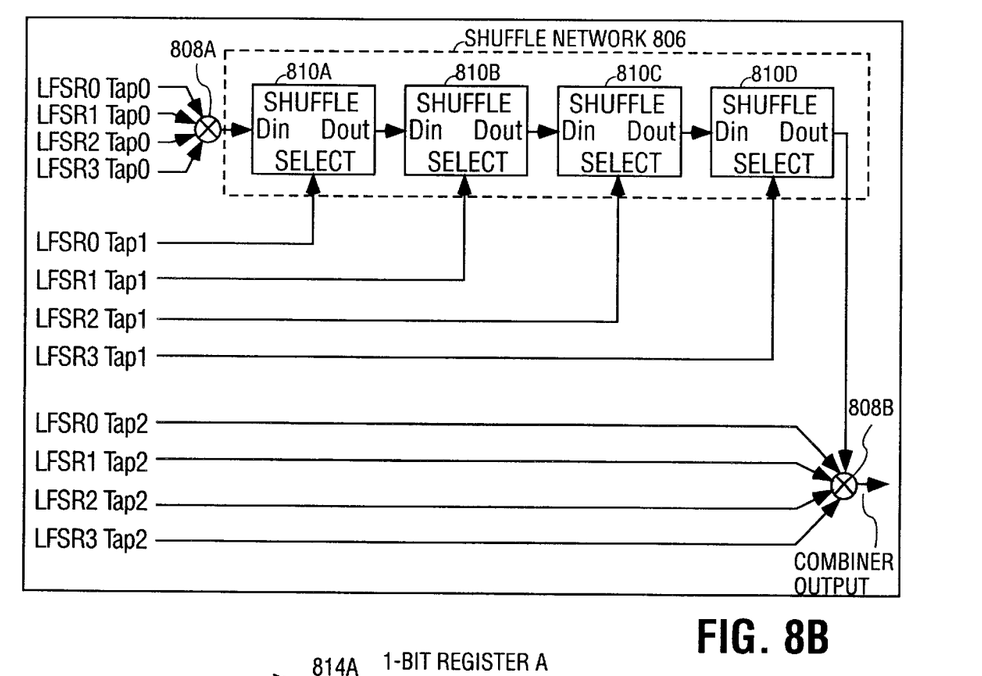
Figure 8C:
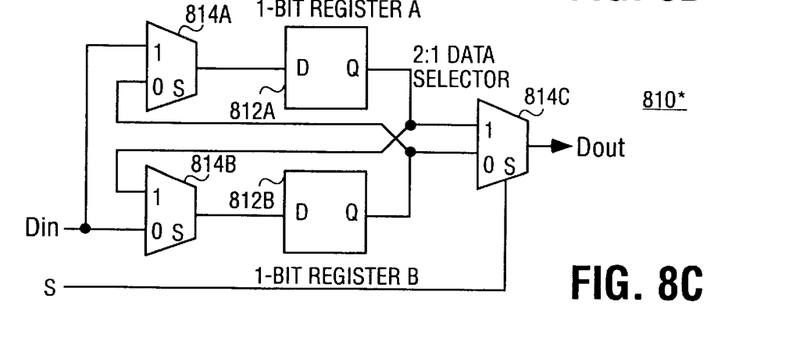

FIGS 8a–8c illustrate the stream key section of FIG. 5 in further detail, in accordance with one embodiment. As illustrated in FIG. 8a, stream key section 506 includes a number of linear feedback shift registers (LFSRs) 802 and combiner function 804, coupled to each other as shown. LFSRs 802 are collectively initialized with a stream cipher key, e.g. earlier described frame key $K_f$. During operation, the stream cipher key successively shifted through LFSRs 802. Selective outputs are taken from LFSRs 802, and combiner function 804 is used to combine the selective outputs. In stream mode (under which, rekeying is enabled), the combined result is used to dynamically modify a then current state of a block cipher key in block key section 502.

For the illustrated embodiment, four LFSRs of different lengths are employed. Three sets of outputs are taken from the four LFSRs. The polynomials represented by the LFSR and the bit positions of the three sets of LFSR outputs are given by the table to follow:

TABLE V

Polynomials of the LFSR and tap positions.

| | | Combining Function Taps | | |
|---|---|---|---|---|
| LFSR | Polynomial | 0 | 1 | 2 |
| 3 | $X^{17} + x^{15} + x^{11} + x^5 + 1$ | 6 | 12 | 17 |
| 2 | $X^{16} + x^{15} + x^{12} + x^8 + x^7 + x^5 + 1$ | 6 | 10 | 16 |
| 1 | $X^{14} + x^{11} + x^{10} + x^7 + x^6 + x^4 + 1$ | 5 | 9 | 14 |
| 0 | $X^{13} + x^{11} + x^9 + x^5 + 1$ | 4 | 8 | 13 |

The combined result is generated from the third set of LFSR outputs, using the first and second set of LFSR outputs as data and control inputs respectively to combiner function 802. The third set of LFSR outputs are combined into a single bit. In stream mode (under which, rekeying is enabled), the combined single bit is then used to dynamically modify a predetermined bit of a then current state of a block cipher key in block key section 502.

FIG. 8b illustrates combiner function 804 in further detail, in accordance with one embodiment. As illustrated, combiner function 804 includes shuffle network 806 and XOR 808a–808b, serially coupled to each other and LFSRs 802 as shown. For the illustrated embodiment, shuffle network 806 includes four binary shuffle units 810a–810d serially coupled to each other, with first and last binary shuffle units 810a and 810d coupled to XOR 808a and 808b respectively. XOR 808a takes the first group of LFSR outputs and combined them as a single bit input for shuffle network 806. Binary shuffle units 810a–810d serially propagate and shuffle the output of XOR 808a. The second group of LFSR outputs are used to control the shuffling at corresponding ones of binary shuffle units 810a–810d. XOR 808b combines the third set of LFSR outputs with the output of last binary shuffle unit 810d.

FIG. 8c illustrates one binary shuffle unit 810* (where * is one of a–d) in further detail, in accordance with one embodiment. Each binary shuffle unit 810* includes two flip-flops 812a and 812b, and a number of selectors 814a–814c, coupled to each other as shown. Flip-flops 812a and 812b are used to store two state values (A, B). Each selector 814a, 814b or 814c receives a corresponding one of the second group of LFSR outputs as its control signal.

Selector 814a–814b also each receives the output of XOR 808a or an immediately preceding binary shuffle unit 810* as input. Selector 814a–814b are coupled to flip-flops 812a–812b to output one of the two stored state values and to shuffle as well as modify the stored values in accordance with the state of the select signal. More specifically, for the illustrated embodiment, if the stored state values are (A, B), and the input and select values are (D, S), binary shuffle unit 810* outputs A, and stores (B, D) if the value of S is "0". Binary shuffle unit 810* outputs B, and stores (D, A) if the value of S is "1".

Referring now to back to FIG. 5, as illustrated and described earlier, mapping function 508 generates the pseudo random bit sequence based on the contents of selected register of block key section 502 and data section 504. In one embodiment, where block key section 502 and data section 504 are implemented in accordance with the respective embodiments illustrated in FIGS. 6–7, mapping function 508 generates the pseudo random bit sequence at 24-bits per clock based on the contents of registers ($K_y$ and $K_z$,) 602b–602c and ($B_y$ and $B_z$) 702b–702c. More specifically, each of the 24 bits is generated by performing the XOR operation on nine terms in accordance with the following formula:

$$(B_0 \cdot K_0) \oplus (B_1 \cdot K_1) \oplus (B_2 \cdot K_2) \oplus (B_3 \cdot K_3) \oplus (B_4 \cdot K_4) \oplus (B_5 \cdot K_5) \oplus (B_6 \cdot K_6) \oplus B_7 \oplus K_7$$

Where "$\oplus$" represents a logical XOR function, "·" represents a logical AND function, and the input values B and K for the 24 output bits are invention are possible. In particular, while the present invention has been described as being implemented in interfaces 108a and 108b, some of the logic may be distributed in other components of video source and sink devices 102 and 104. Additionally, non-LFSR based stream key section, more or less block key registers, larger or smaller block key registers, more or less substitution units, including alternative substitution patterns, as well as different linear transformation units may be employed. Thus, the present invention is not limited by the details described, instead, the present invention can be practiced with modifications and alterations within the spirit and scope of the appended claims.

What is claimed is:

1. In a video source device, a method comprising:
providing a basis value for a symmetric ciphering/deciphering process to enable a video sink device to receive video content from the video source device;
ciphering the video content for transmission to the video sink device, including
generation of a first cipher key through functional transformation of the basis value in a block mode of operation and performing stream ciphering based on the first cipher key; and
verifying periodically symmetrical deciphering of the transmitted video content by the video sink device.

2. The method of claim 1, wherein said ciphering process comprises subsequent generation of a plurality of cipher keys using the first cipher key.

3. The method of claim 1, wherein the functional transformation comprises employing an authentication key gen-

| Output bit | Input |||||||||||||||| 
|---|---|---|---|---|---|---|---|---|---|---|---|---|---|---|---|---|
| | $B_0$ | $B_1$ | $B_2$ | $B_3$ | [$B_4$ | $B_5$ | $B_6$ | $B_7$ | $K_0$ Origin | $K_1$ | $K_2$ | $K_3$ | $K_4$ | $K_5$ | $K_6$ | $K_7$ |
| | $B_z$ | $B_z$ | $B_z$ | $B_z$ | $B_z$ | $B_z$ | $B_z$ | $B_y$ | $K_z$ | $K_z$ | $K_z$ | $K_z$ | $K_z$ | $K_z$ | $K_z$ | $K_y$ |
| 0 | 14 | 23 | 7 | 27 | 3 | 18 | 8 | 20 | 12 | 24 | 0 | 9 | 16 | 7 | 20 | 13 |
| 1 | 20 | 26 | 6 | 15 | 8 | 19 | 0 | 10 | 26 | 18 | 1 | 11 | 6 | 20 | 12 | 19 |
| 2 | 7 | 20 | 2 | 10 | 19 | 14 | 26 | 17 | 1 | 22 | 8 | 13 | 7 | 16 | 25 | 3 |
| 3 | 22 | 12 | 6 | 17 | 3 | 10 | 27 | 4 | 24 | 2 | 9 | 5 | 14 | 18 | 21 | 15 |
| 4 | 22 | 24 | 14 | 18 | 7 | 1 | 9 | 21 | 19 | 24 | 20 | 8 | 13 | 6 | 3 | 5 |
| 5 | 12 | 1 | 16 | 5 | 10 | 24 | 20 | 14 | 27 | 2 | 8 | 16 | 15 | 22 | 4 | 21 |
| 6 | 5 | 3 | 27 | 8 | 17 | 15 | 21 | 12 | 14 | 23 | 16 | 10 | 27 | 1 | 7 | 17 |
| 7 | 9 | 20 | 1 | 16 | 5 | 25 | 12 | 6 | 9 | 13 | 22 | 17 | 1 | 24 | 5 | 11 |
| 8 | 23 | 25 | 11 | 13 | 17 | 1 | 6 | 22 | 25 | 21 | 18 | 15 | 6 | 11 | 1 | 10 |
| 9 | 4 | 0 | 22 | 17 | 25 | 10 | 15 | 18 | 0 | 20 | 26 | 19 | 4 | 15 | 9 | 27 |
| 10 | 23 | 25 | 9 | 2 | 13 | 16 | 4 | 8 | 2 | 11 | 27 | 19 | 14 | 22 | 4 | 7 |
| 11 | 3 | 6 | 20 | 12 | 25 | 19 | 10 | 27 | 24 | 3 | 14 | 6 | 23 | 17 | 10 | 1 |
| 12 | 26 | 1 | 18 | 21 | 14 | 4 | 10 | 0 | 17 | 7 | 26 | 0 | 23 | 11 | 14 | 8 |
| 13 | 2 | 11 | 4 | 21 | 15 | 24 | 18 | 9 | 5 | 16 | 12 | 2 | 26 | 23 | 11 | 6 |
| 14 | 22 | 24 | 3 | 19 | 11 | 4 | 13 | 5 | 22 | 0 | 18 | 8 | 25 | 5 | 15 | 2 |
| 15 | 12 | 0 | 27 | 11 | 22 | 5 | 16 | 1 | 10 | 3 | 15 | 19 | 21 | 27 | 6 | 18 |
| 16 | 24 | 20 | 2 | 7 | 15 | 18 | 8 | 3 | 12 | 20 | 5 | 19 | 1 | 27 | 8 | 23 |
| 17 | 12 | 16 | 8 | 24 | 7 | 2 | 21 | 23 | 17 | 2 | 11 | 14 | 7 | 25 | 22 | 16 |
| 18 | 19 | 3 | 22 | 9 | 13 | 6 | 25 | 7 | 4 | 10 | 2 | 17 | 21 | 24 | 13 | 22 |
| 19 | 11 | 17 | 13 | 26 | 4 | 21 | 2 | 16 | 3 | 4 | 13 | 26 | 18 | 23 | 9 | 25 |
| 20 | 17 | 23 | 26 | 14 | 5 | 11 | 0 | 15 | 26 | 3 | 9 | 19 | 21 | 12 | 6 | 0 |
| 21 | 9 | 14 | 23 | 16 | 27 | 0 | 6 | 24 | 18 | 21 | 3 | 27 | 4 | 10 | 15 | 26 |
| 22 | 7 | 21 | 8 | 13 | 1 | 26 | 19 | 25 | 25 | 0 | 12 | 10 | 7 | 17 | 23 | 9 |
| 23 | 27 | 15 | 23 | 5 | 0 | 9 | 18 | 11 | 8 | 0 | 25 | 20 | 16 | 5 | 13 | 12 |

Accordingly, a novel method and apparatus for ciphering and deciphering video content to protect the video content from unauthorized copying during transmission has been described.

Epilogue

From the foregoing description, those skilled in the art will recognize that many other variations of the present erated as an integral part of an authentication process authenticating the video sink device.

4. The method of claim 3, wherein said authentication key is generated using identifiers of the video source device and the video sink device, and said authentication process comprises exchanging the identifiers.

5. The method of claim 1, wherein said periodic verification comprises receiving selected ones of a plurality of verification values from the video sink device at predetermined points in time during said ciphering/deciphering process, and comparing the received verification values to corresponding ones of a plurality of verification reference values.

6. The method of claim 5, wherein said ciphering process comprises generating a pseudo random bit sequence for ciphering the video content, said verification reference values are symmetrically derived from the pseudo random bit sequence.

7. In a video source device, a method comprising:
   authenticating a video sink device to receive a video content from the video source device, including generation of an authentication key;
   ciphering the video content for transmission, to the video sink device in a stream mode of operation, including generation of a first cipher key using at least the authentication key in a block mode of operation; and
   verifying periodically symmetrical deciphering of the transmitted video content by the video sink device.

8. The method of claim 7, wherein said ciphering process further comprises subsequent generation of a plurality of cipher keys using the first cipher key.

9. The method of claim 7, wherein said authentication key is generated using identifiers of the video source and sink devices, and said authentication process comprises exchanging the identifiers.

10. The method of claim 7, wherein said periodic verification comprises receiving selected ones of a plurality of verification values from the video sink device at predetermined points in time during the ciphering/deciphering process, and comparing the received verification values to corresponding ones of a plurality of verification reference values.

11. The method of claim 10, wherein said ciphering process comprises generating a pseudo random bit sequence for ciphering the video content, said verification reference values are symmetrically derived from the pseudo random bit sequence.

12. An apparatus comprising:
   a first control unit to provide a basis value for a symmetric ciphering/deciphering process to enable a video sink device to receive a video content from the video source device;
   a cipher unit coupled to the first control unit including a stream cipher unit to cipher the video content for transmission to the video sink device, and further including a block cipher unit that generates a first cipher key through functional transformation of the basis value in a block mode of operation;
   wherein output of the block cipher unit is input into the stream cipher unit and input back into the block cipher unit as feedback; and
   a second control unit coupled to the cipher unit to periodically verify symmetrical deciphering of the transmitted video content by the video sink device.

13. The apparatus of claim 12, wherein said block cipher unit is further to generate a plurality of additional cipher keys using the first cipher key.

14. The apparatus of claim 13, wherein said first control unit is further to authenticate the video sink device and generate an authentication key as an integral part of the authentication process, and the block cipher unit to functionally transform the basis value employing the authentication key.

15. The apparatus of claim 12, wherein said second control unit receives selected ones of a plurality of verification values from the video sink device at predetermined points in time during said ciphering/deciphering process, and compares the received verification values to corresponding ones of a plurality of verification reference values.

16. The apparatus of claim 15, wherein said the stream cipher unit is further to generate a pseudo random bit sequence for ciphering the video content, and said second control unit derives said verification reference values from the pseudo random bit sequence.

17. An apparatus comprising:
   a first control unit to authenticate a video sink device to receive a video content from the video source device, including generation of an authentication key;
   a cipher unit coupled to the first control unit including a stream cipher unit to cipher the video content for transmission to the video sink device, and further including a block cipher unit to generate a first cipher key using at least the authentication key; and
   a second control unit coupled to the cipher unit to verify periodically symmetrical deciphering of the transmitted video content by the video sink device.

18. The apparatus of claim 17, wherein said block cipher unit is further to generate said first cipher key using at least said authentication key, and to successively generate a plurality of additional cipher keys using the first cipher key.

19. The apparatus of claim 17, wherein said first control unit also exchanges device identifiers with the video sink device, and generates the authentication key using the device identifiers.

20. The apparatus of claim 17, wherein said second control unit receives selected ones of a plurality of verification values from the video sink device at predetermined points in time during the ciphering/deciphering process, and compares the received verification values to corresponding ones of a plurality of verification reference values.

21. The apparatus of claim 20, wherein said ciphering/deciphering the video content, said verification reference values are derived from the pseudo random bit sequence.

22. The apparatus of claim 20, further comprising means for generating a pseudo random bit sequence for ciphering/deciphering the video content, and means for deriving verification reference values from the pseudo random bit sequence.

23. In a video sink device, a method comprising:
   receiving a basis value for a symmetric ciphering/deciphering process from a video source device;
   deciphering received video content in ciphered form from the video source device using a stream mode of operation, including generation of a first decipher key through functional transformation of the basis value in a block mode of operation and performing stream ciphering based on the first cipher key; and
   providing periodically verification values to the video source device to trigger verification that the ciphered video content is indeed being symmetrically deciphered.

24. The method of claim 23, wherein said deciphering process comprises subsequent generation of a plurality of decipher keys using the first decipher key.

25. The method of claim 23, wherein the functional transformation comprises employing an authentication key generated as an integral part of an authentication process authenticating the video source device.

26. The method of claim 23, wherein said authentication key is generated using identifiers of the video source and the sink device, and said authentication process include exchanging the identifiers.

27. The method of claim 23, wherein said deciphering processes comprises generating a pseudo random bit sequence for deciphering the video content, said periodic provision of selected ones of verification values include symmetrically deriving the verification values from the pseudo random bit sequence.

28. In a video sink device, a method comprising:
authenticating a video source device, including generation of an authentication key in a block mode of operation;
deciphering ciphered video content received from the video source device using a stream mode of operation, including generation of a first decipher key using at least the authentication key in a block mode of operation; and
providing periodically verification values to the video source device to trigger verification that the ciphered video content is indeed being symmetrically deciphered.

29. The method of claim 28, wherein said deciphering process further comprises subsequent generation of a plurality of decipher keys using the first decipher key.

30. The method of claim 28, wherein said authentication key is generated using identifiers of the video source and the sink device, and said authentication process include exchanging the identifiers.

31. The method of claim 28, wherein said deciphering process comprises generating a pseudo random bit sequence for deciphering the video content, and said verification values are symmetrically derived from the pseudo random bit sequence.

32. An apparatus comprising:
a first control unit to receive a basis value for a symmetric ciphering/deciphering process from a video source device;
a decipher unit coupled to the first control unit including a stream decipher unit to decipher ciphered video content from the vide source device, and further including a block decipher unit that generates a first decipher key through functional transformation of the basis value in a block mode of operation; and
a second control unit coupled to the decipher unit to periodically provide verification values to the video source device to trigger verification that indeed the ciphered video content is being symmetrically deciphered.

33. The apparatus of claim 32, wherein said block decipher unit is further to perform said functionally transformation of the basis value to generate the initial decipher key, and to successively generate a plurality of additional decipher keys using the first decipher key.

34. The apparatus of claim 33, wherein said first control unit is further to authenticate the video source device and generate an authentication key as an integral part of the authentication process, and the block decipher unit to functionally transform the basis value employing the authentication key.

35. The apparatus of claim 33, wherein said stream decipher unit is further to generate a pseudo random bit sequence for deciphering the video content, and said second control unit derives said verification values from the pseudo random bit sequence.

36. An apparatus comprising:
a first control unit to authenticate a video source device, including generation of an authentication key;
a decipher unit coupled to the first control unit including a stream decipher unit to decipher ciphered video content from the video source device, and further including a block decipher unit to generate a first decipher key using at least the authentication key; and
a second control unit coupled to the decipher unit to provide periodically verification values to the video source device to trigger verification that the ciphered video content is indeed being symmetrically deciphered.

37. The apparatus of claim 36, wherein said decipher unit comprises a block decipher unit is further to generate said first decipher key using at least said authentication key, and to successively generate a plurality of additional decipher keys using the first decipher key.

38. The apparatus of claim 36, wherein said first control unit also exchanges device identifiers with the video source device, and generates the authentication key using the device identifiers.

39. The apparatus of claim 36, wherein said stream decipher unit is further to generate a pseudo random bit sequence for deciphering the video content, said verification values are derived from the pseudo random bit sequence.

40. A method comprising:
providing a basis value and an identification key for a symmetric ciphering/deciphering process to a receiving device;
receiving an identification key from the receiving device;
authenticating the receiving device by generating a common secret authentication key based upon a preconfigured array of private keys and an identifier associated with the receiving device;
ciphering content for transmission to the receiving device using a first cipher key, the first cipher key based upon block ciphered basis value using common secret authorization key; and
transmitting the ciphered content from the source device to the receiving device.

41. The method of claim 40, further comprising:
authenticating the source device to provide content to the receiving device, wherein the authenticating the source device comprises generating a source device authentication key;
receiving the ciphered content from the source device; and
symmetrically deciphering the ciphered content, wherein the deciphering the ciphered content comprises generating a first decipher key using at the source device authentication key.

42. The method of claim 40, wherein the receiving device and the source device comprise identifiers, wherein the authentication keys are based on their corresponding identifiers.

43. The method of claim 40, wherein the periodically verifying the symmetrical deciphering of the ciphered content comprises receiving the verification values from the receiving device and comparing the verification values with the corresponding verification reference values derived from a pseudo random bit sequence.

44. The method of claim 40, further comprising providing a basis value associated with a symmetric ciphering/ deciphering process to the receiving device to receive the ciphered content from the source device, wherein the basis value comprises a random number.

45. A method comprising:
authenticating a receiving device to receive content from a source device, wherein the authenticating the receiving device comprises generating a receiving device authorization key;

authenticating the source device to provide content to the receiving device, wherein the authenticating the source device comprises generating a source device authentication key;

ciphering the content for transmission to the receiving device, wherein the ciphering the content comprises generating a first cipher key using at least the receiving device authorization key;

transmitting the ciphered content from the source device to the receiving device;

receiving the ciphered content from the source device; and deciphering the ciphered content, wherein the deciphering the ciphered content comprises generating a first decipher key using at the source device authentication key.

46. The method of claim 45, further comprising:

periodically providing verification values from the receiving device to the source device to trigger verification of the deciphering of the ciphered content;

receiving the verification values from the receiving device; and verifying the deciphering of the ciphered content.

47. The method of claim 45, further comprising:

providing a basis value associated with a ciphering/deciphering process from the source device to the receiving device;

receiving the basis value associated with the ciphering/deciphering process;

ciphering the content, wherein the ciphering the content comprises generating the first cipher key through functional transformation of the basis value; and symmetrically deciphering the ciphered content, wherein the deciphering the ciphered content comprises generating the first decipher key through functional transformation of the basis value.

48. A method comprising:

providing a basis value from a source device to a sink device, wherein the basis value is a first random number;

providing a source identification key from the source device to the sink device;

receiving a sink identification key at the source device from the sink device;

independently generating authentication key at the source device and at the sink device, wherein the source device and the sink device having respective copies of the authentication key;

generating an initial session key for transmission session by block ciphering the basis value using the authentication key as a block cipher key;

generating a second random number;

stream ciphering content using the initial session key; and generating a frame key for the next frame by block ciphering an immediately preceding version of the second random number using the initial session key as the block cipher key.

49. The method of claim 48, further comprising generating a current version of the second random number by generating a pseudo random bit sequence using a stream cipher with the previous version of the second random number and the frame key.

50. The method of claim 48, wherein the source device generates its copy of the authentication key by summing private key of its provided array indexed by the sink identification key.

51. The method of claim 48, wherein the sink device generates its copy of the authentication key by summing private key of its provided array indexed by the source identification key.

52. An apparatus comprising:

a source device to provide a basis value to a sink device, wherein the basis value is a first random number;

the source device to provide a source identification key to the sink device;

the source device to receive a sink identification key from the sink device, wherein the sink identification key is generated by the sink device;

the source device to independently generate an authentication key, wherein a respective copy of the authentication key is also generated by the sink device;

a block cipher unit to generate an initial session key for transmission session by block ciphering the basis value using the authentication key as a block cipher key;

the source device generating a second random number;

a stream cipher unit to stream cipher content using the initial session key; and the source device to generate a frame key for the next frame by block ciphering an immediately preceding version of the second random number using the initial session key as the block cipher key.

53. The apparatus of claim 52, wherein the source device is further to generate a current version of the second random number by generating a pseudo random bit sequence using a stream cipher with the previous version of the second random number and the frame key.

54. The apparatus of claim 52, wherein the source device generates its copy of the authentication key by summing private key of its provided array indexed by the sink identification key.

55. The apparatus of claim 52, wherein the sink device generates its copy of the authentication key by summing private key of its provided array indexed by the source identification key.

56. The apparatus of claim 52, means for generating a copy of the authentication key for the sink device by summing private key of its provided array indexed by the source identification key.

57. An apparatus comprising:

means for providing a basis value to a sink device, wherein the basis value is a first random number;

means for providing a source identification key to the sink device;

means for receiving a sink identification key from the sink device;

means for independently generating an authentication key;

means for generating an initial session key for transmission session by block ciphering the basis value using the authentication key as a block cipher key;

means for generating a second random number;

means for stream ciphering content using the initial session key; and means for generating a frame key for the next frame by block ciphering an immediately preceding version of the second random number using the initial session key as the block cipher key.

58. The apparatus of claim 57, further comprises means for generating a current version of the second random number by generating a pseudo random bit sequence using a stream cipher with the previous version of the second random number and the frame key.

59. The apparatus of claim 57, further comprises means for generating a copy of the authentication key for a source device by summing private key of its provided array indexed by the sink identification key.

60. An apparatus comprising:
means for providing a basis value for a symmetric ciphering/deciphering process to enable a video sink device to receive a video content from a video source device;
means for ciphering the video content in a stream mode of operation for transmission to the video sink device, and further means for generating a first cipher key through functional transformation of the basis value in a block mode of operation and performing stream ciphering based on the first cipher key; and
means for periodically verifying symmetrical deciphering of the transmitted video content by the video sink device.

61. The apparatus of claim 60, further comprising means for generating a plurality of additional cipher keys using the first cipher key.

62. The apparatus of claim 60, further comprising means for generating a pseudo random bit sequence for ciphering the video content, and means for deriving verification reference values from the pseudo random bit sequence.

63. An apparatus comprising:
means for authenticating a video sink device to receive a video content from a video source device, including generating an authentication key;
means for ciphering the video content in a stream mode of operation for transmission to the video sink device, and further means for generating a first cipher key using at least the authentication key in a block mode of operation; and
means for verifying periodically symmetrical deciphering of the transmitted video content by the video sink device.

64. The apparatus of claim 63, further comprising means for generating said first cipher key using at least said authentication key, and for successively generating a plurality of additional cipher keys using the first cipher key.

65. An apparatus comprising:
means for receiving a basis value for a symmetric ciphering/deciphering process from a video source device;
means for deciphering ciphered video content in a stream mode of operation from the vide source device, and means for generating a first decipher key through functional transformation of the basis value in a block mode of operation and performing stream ciphering based on the first cipher key; and
means for periodically providing verification values to the video source device for triggering verification that indeed the ciphered video content is being symmetrically deciphered.

66. The apparatus of claim 65, further comprising means for performing functional transformation of the basis value for generating the initial decipher key, and for successively generating a plurality of additional decipher keys using the first decipher key.

67. The apparatus of claim 65, further comprising means for generating a pseudo random bit sequence for deciphering the video content, wherein said verification values are derived from the pseudo random bit sequence.

68. An apparatus comprising:
means for authenticating a video source device, including generating an authentication key;
means for deciphering ciphered video content in a steam mode of operation from the video source device, and means for generate a first decipher key using at least the authentication key in a block mode of operation; and
means for providing periodically verification values to the video source device for triggering verification that the ciphered video content is indeed being symmetrically deciphered.

69. The apparatus of claim 68, further comprising means for generating said first decipher key using at least said authentication key, and means for successively generating a plurality of additional decipher keys using the first decipher key.

70. The apparatus of claim 68, further comprising means for generating a pseudo random bit sequence for deciphering the video content, wherein said verification values are derived from the pseudo random bit sequence.

* * * * *

UNITED STATES PATENT AND TRADEMARK OFFICE
CERTIFICATE OF CORRECTION

PATENT NO.   : 6,477,252 B1
DATED        : November 5, 2002
INVENTOR(S)  : Faber et al.

It is certified that error appears in the above-identified patent and that said Letters Patent is hereby corrected as shown below:

Column 6,
Line 67, after "transformed.", insert -- The random number provided to block key section 502 is independently transformed, whereas transformation of the random number provided to data section 504 is dependent on the transformation being performed in block key section 502. Mapping block 506 retrieves a subset each, of the newly transformed states of the two random numbers, and reduces them to generate one bit of the pseudo random bit sequence. Thus, in a desired number of clock cycles, a pseudo random bit sequence of a desired length is generated. --.

Column 10,
Line 11, before "successively", insert -- is --.

Signed and Sealed this

Twenty-second Day of July, 2003

JAMES E. ROGAN
*Director of the United States Patent and Trademark Office*